(12) United States Patent
Goldberg

(10) Patent No.: US 12,112,274 B2
(45) Date of Patent: Oct. 8, 2024

(54) SELF-LEARNING AND REPAIRING ROBOTIC PROCESS AUTOMATION FOR TELECOM EXPENSE MANAGEMENT

(71) Applicant: Tangoe US, Inc., Indianapolis, IN (US)

(72) Inventor: Zachary Goldberg, Indianapolis, IN (US)

(73) Assignee: Tangoe US, Inc., Indianapolis, IN (US)

( * ) Notice: Subject to any disclaimer, the term of this patent is extended or adjusted under 35 U.S.C. 154(b) by 922 days.

(21) Appl. No.: 17/164,083

(22) Filed: Feb. 1, 2021

(65) Prior Publication Data

US 2022/0245479 A1    Aug. 4, 2022

(51) Int. Cl.
*G06F 16/951* (2019.01)
*G06N 5/04* (2023.01)
*G06N 20/00* (2019.01)
*G06Q 50/50* (2024.01)

(52) U.S. Cl.
CPC ............ *G06N 5/04* (2013.01); *G06F 16/951* (2019.01); *G06N 20/00* (2019.01); *G06Q 50/50* (2024.01)

(58) Field of Classification Search
None
See application file for complete search history.

(56) References Cited

U.S. PATENT DOCUMENTS

| | | | |
|---|---|---|---|
| 10,682,761 B2 | 6/2020 | Geffen et al. | |
| 10,802,453 B2 | 10/2020 | Allen, IV et al. | |
| 2003/0191711 A1* | 10/2003 | Jamison | G06Q 20/14 705/40 |
| 2018/0345489 A1* | 12/2018 | Allen, IV | G05B 19/0421 |
| 2018/0370033 A1* | 12/2018 | Geffen | G06F 16/00 |

* cited by examiner

*Primary Examiner* — Amresh Singh
(74) *Attorney, Agent, or Firm* — Farber LLC; Jonathan Winter

(57) ABSTRACT

A system and method incorporating Robotic Processing Automation (RPA) and machine leaning to finding telecom expense management information accessed through a site or portal such that RPA bots are able to learn the most effective way to access the information using the minimum amount computing resources and allowing for the RPA bot to self-modify to optimize and adjust to changing environments on the site or portal with minimal or even no manual intervention.

33 Claims, 8 Drawing Sheets

FIG. 5. Example website processing with RPA self healing approach

SELF-LEARNING AND REPAIRING ROBOTIC PROCESS AUTOMATION FOR TELECOM EXPENSE MANAGEMENT

FIELD OF THE INVENTION

The present invention relates to systems and methods for obtaining telecom expense management related information through robotic process automation, where Robotic Process Automation (RPA) agents can modify the processes they follow to adapt to changing websites without need of human intervention.

BACKGROUND OF THE INVENTION

Robotic process automation has been a growing trend to facilitate common and repetitive tasks traditionally done by humans. It is helping corporations eliminate the need to hire people to perform tedious and mundane tasks, accuracy and productivity is increased, and these RPAs allow for job creation towards higher value functions.

There are a number of different types of automation. Attended automation is when a computer performs a subset of tasks to assist a person in completing a task. Unattended Robotic Process Automation (RPA) is when a computer performs a task independently and with human intervention. Automation was first introduced in connection with various manufacturing tasks on assembly lines and so forth. However, the tasks that can be performed via a computer have greatly expanded including the gathering and processing of data via a network, such as, over the Internet.

Telecom Expense Management (TEM) is an industry focused on the analysis of telecommunication expenses and the adjustment of service plans and/or equipment to reduce operating costs and provide optimal telecom service to meet a company's telecom needs. Often this requires the locating, retrieval and processing of a vast amount of complex data from multiple sources. The scale of the data to be collected and the repetitive nature of the types of data to be collected lends itself well to RPA.

For example, one TEM service provider may have thousands of customers, where each of those customers employs thousands of workers. Each of those customers may utilize many different carriers and equipment and service suppliers as companies have locations that span the country. Each of those carriers will generate invoices that must be gathered, validated, and paid on time. In fact, many carriers provide incentives if these invoices are paid within a specified period of time (e.g., within seven days of the invoice being issued) and some TEM vendors rely on these incentives/discounts to ensure their profitability. Accordingly, the need to rapidly and accurately locate, gather and verify invoices from many different sources is very important.

Yet another challenge faced by TEM vendors is that carriers are quite often changing or adjusting the plans offered, which can have a major impact on the cost to the customer. For example, carriers often change the cost of voice and data plans based on use, the number of devices using the carrier and other criteria. For TEM vendors that are monitoring the various plans offered by the various carriers to select the best plans (i.e., the best service and best price) for the customer, it is critical to locate, gather and analyze this information as quickly as possible. Alternatively, carriers may upgrade or modify their equipment and include creative combinations of plans with equipment. All this information that could potentially provide better telecom service and lower telecom costs to the customer is vital to the TEM vendor to obtain as fast as possible as profitability for the TEM vendor is often directly tied to the quality of service and reduction in price they can obtain for the customer.

The initial way that computers were used to gather data on the Internet included recording a series of steps that a person went through to locate particular data. The individual manually went through the process and then once the steps were recorded, a computer (a "bot") could then follow the recorded steps to obtain the data at a second time and so on going forward. This process is fine for gathering data in a static environment, however, in the telecom field due to the ever-changing nature of plans and programs and even website adjustments, the bots would no longer be able to function when they could not proceed exactly according to the recorded series of steps. This would mean an individual would have to step in and manually help the computer navigate the website and re-record the series of steps. When the changes occur on a monthly (or even weekly) basis, this completely abrogates the benefit of having a bot gather data.

From those early days the trend has been that carrier websites and RPA have become more sophisticated. For example, various graphical models allow for the creation of input models using drag and drop tools allowing for automated field entry from an input file by dragging data into a Graphical User Interface (GUI) representation on a target website or vice versa. Additionally, natural language processing has been utilized where an individual can provide voice commands to an RPA. Other more recent techniques include facilitating the interpretation of logic flow charts or other representations of the actions the RPA is supposed to take.

Currently, the RPA will include some form of input file or instruction set that will control the actions of the RPA to perform a desired process. This file will include information that frames what the RPA is expected to encounter on a target website (i.e., the steps it needs to take to navigate the website) to perform the programmed function. As such, these systems employ little, if any, machine learning. It would be desirable to apply machine learning to RPAs in the TEM space due to dynamic nature of the telecom business models.

U.S. Pat. No. 10,682,761 (Geffen) teaches a system that detects and repairs robotic process automation failures. However, Geffen relies on a fixed set of possible tasks or manual steps to overcome tasks in the failure queue to retrain the bots. The fixed set of possible task limitation makes this type of approach unworkable for dynamic nature of TEM system changes.

U.S. Pat. No. 10,802,453 (Allen) teaches a method of modifying RPA bot behavior by pushing updates through a rules database without the need to individually reconfiguring each bot. However, this system again relies on a rules database used to store execution data that used by and direct the RPA bot. When applied to TEM applications, the variability of the dataset renders this type of approach unsatisfactory for TEM providers dealing with dynamic changes in carrier websites and data.

It would thus be very beneficial to have a system that is capable of adapting to dynamic changes made to a website without requiring the rewriting or modification of the code that is used for the RPA. This type of approach would remove the manual process requirements of having to correct errors and adapt robots when websites change and as vendors change their secure environments. This would also remove the requirement to push out changes to a database that controls the RPA bot.

Therefore, a need exists for a system and method that applies machine learning to build and automatically modify an RPA bot to adapt to a changing environment within the TEM domain to gather data required to perform TEM functions.

SUMMARY OF THE INVENTION

Accordingly, it is desired to provide a system and method that utilizes RPA bots to gather data from websites and portals containing TEM related information.

It is also desired to provide a system and method that generates RPA bots from a simple template from which the bots can apply machine learning to develops into fully functioning RPA bots adapting and evolving to specific carrier or vendor systems and automatically changing when and as these target carrier systems change without human intervention.

It is further desired to provide a system and method that provides an RPA bot that retrieves TEM data, such as, invoices or orders or available options, and detects changes to vendor and carrier systems and based on those detected changes, dynamically self-adapts without the need for reprogramming, reconfiguration or manual intervention.

It is still further desired to provide a system and method that facilitates an RPA bot to build itself from a basic model or template, which automatically adapts to a new carrier or vendor site with little more than the credentials to access such site and a description of the data to be gathered with a few synonyms to aid the bot in locating the data.

It is yet further desired to provide a system and method that utilizes machine learning to optimize how an RPA bot recognizes target data and navigates a webpage or portal where this data is located allowing the RPA bot to grow and evolve based on the target site.

It is yet further desired to provide a system and method that recognized when websites are in maintenance mode and defers processing until such time that websites are available and functioning.

It is yet further desired to provide a system and method that recognizes when the RPA is no longer able to overcome a situation and to trigger manual intervention in these situations, such as when website credentials are no longer valid or when websites have been permanently moved.

Finally, it is desired to provide a system and method that eliminates the need for manual intervention to correct errors in RPA bot programming when the sites the bot is accessing have changed or the access points for the data the bot is seeking have been modified.

In one configuration, a computer having software executing thereon is provided where the software comprises a Robotic Process Automation (RPA) bot that is adapted to access telecommunications carrier websites to obtain Telecom Expense Management (TEM) data. The TEM data could include, but is not limited to, invoices, reports, carrier plan offerings, inventories of active TEM related devices, as well as currently available features, device models, and accessories to populate TEM procurements systems, and so on.

The RPA bot is provided with the ability to log into and navigate a carrier site or portal utilizing an input model outlining a set of steps to locate and obtain the target telecom expense management data is provided. Initially, the RPA robot is able to configure the appropriate access strategy and input model by building upon a basic foundation template that includes a simple description of the data being sought and the credentials and address to access the appropriate system. Over time, the input mode evolves including developing efficient paths to the data as well as timing related information as to the availability of the data.

The RPA bot is provided with the ability to employ alternating access requests to retry accesses from different or varying IP addresses to minimize risk of lock out or triggering security protocols when authentication fails or times out. In the event that the RPA bot is not able to access the site due to failed authentication, the system is provided to automatically call for reset of or adjustment of the input credentials provided to the RPA bot.

The RPA bot is also provided with the ability to detect path failures due to, for example, a change to the carrier site, and employ navigation techniques including for example, the use of synonyms and pseudonyms to find and retrieve the desired data. The RPA is further provided with a self-modification strategy used to modify the input model making changes in order to reflect the new path that resulted in successfully trying various paths and eventually obtaining the desired data.

The problem facing an RPA bot can be explained as follows. If an individual was asked to retrieve an invoice for a billing period (e.g., the current month) from a new telecom carrier site or portal that they have never accessed before, a human possesses the cognitive skills to navigate a new site even if the site utilizes acronyms and industry specific jargon. It would be a relatively easy task to identify the areas you would expect would contain the data you are looking for. For example, one would expect billing information would be found under 'my account', or 'my products' or perhaps 'billing' or 'invoicing' as key words on this main page or main menu visible after logging in. An individual is typically able to quickly narrow down the places to look for the data and navigate efficiently through the site to obtain the desired data. In other words, a human would not need to take a brute force approach of opening and looking at each and every menu on a page until the entire site has been traversed.

A challenge for an RPA bot is to navigate in a similar manner as a person, which is much more efficiently than the brute force approach described above. When using an RPA bot, the brute force approach is not tenable for several reasons. First, such an approach is expensive and time consuming as loading sites and navigating is resource intensive. When one considers the fact that for a single client that may have thousands of employees and is tracking thousands of devices, the sheer number of different carriers and plans and devices to account for would require a huge amount of computing power when many clients are serviced. This is especially so considering the short time frames within which the information must be found, gathered and analyzed to take advantage of payment incentives. In fact, if brute force steps were taken by the RPA bot, it may even trigger intrusion protection methods on the target systems intended to detect and prevent bots from scraping data from these sites.

When an individual with cognitive skills is looking for information on a site or portal, recognizing the data would be both a function of the menu names, the images shown as icons, the file name or a field name in a table or link. To find a current invoice, the individual would most likely look for a name such as 'invoice' or 'bill', an icon such as a dollar sign, or even a name that included the current month or a numerical representation of it. This is the way the RPA bot should search for the data it is looking to obtain.

As an initial step when an RPA bot first accesses a site or portal, it may take the RPA bot time to find the information it is looking for. For example, it may be that the RPA bot opens a number of tabs or menus and has to go back when the data it is looking for is not found. Rather than simply taking a brute force approach, the RPA bot can use programmed synonyms to aid the bot in locating the data. However, once the data is found, the RPA bot has the ability to remember the path used to find that data and can update and remember how to find that data for the next time it seeks to access data. To be clear, the automated adjustment of the RPA files is far more than the automation of a manual process. The RPA bot is able to discard failed attempts and remember the most direct path and appropriate timing that leads to the desired information. This minimizes the computing resources needed to obtain the data and places the least amount of strain on the site or portal due to the RPA bot learning how to access the desired data in the most efficient way. Accordingly, the RPA bot design represents a significant improvement in the way the computer functions to access information.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one configuration an RPA system for gathering TEM data from a provider site is provided, the system comprising a computer having a storage and a network connection and software executing on the computer comprising an RPA bot adapted to access the site, the RPA bot having site access credential information and a template including data relating to the TEM data. The system is provided such that the template includes: the names or tags for the TEM data the RPA bot is to obtain, synonyms of the names or tags, pseudonyms of the names or tags, image files relating to the names or tags, alternate text, and file naming conventions using dates, times, and key words relating to the names or tags. The system is further provided such that the RPA bot accesses the site for a first time and presents the access credential information, and the RPA bot accesses the data in the template to determine a path to access the TEM data on the site. Finally, the system is still further provided such that the RPA bot discards failed path attempts to access the TEM data and saves an identified path that allows the RPA bot to obtain the TEM data, the identified path including only the least number of steps needed to reach the TEM data, and the RPA bot gathers and transmits the TEM data to the computer, where the computer saves the TEM data on the storage.

In another configuration, a method for obtaining TEM data from a provider site by an RPA bot is provided, the method comprising the steps of contacting the site with an RPA bot executing on a computer via a network connection, presenting site access credential information to the site with the RPA bot, which when authenticated enables the RPA bot to access the site, and accessing a template of data with the RPA bot. The template includes the names or tags for the TEM data the RPA bot is to obtain, synonyms of the names or tags, pseudonyms of the names or tags, image files relating to the names or tags, alternate text, and file naming conventions using dates, times, and key words relating to the names or tags. The method further comprises the steps of determining a path to access the TEM data on the site based on the data on the template, discarding failed path attempts by the RPA bot to access the TEM data, and saving an identified path that allows the RPA bot to obtain the TEM data, the identified path including only the least number of steps needed to reach the TEM data. Finally, the method includes the steps of gathering and transmitting the TEM data to the computer and saving the received TEM data on a storage accessible by the computer.

Other objects of the invention and its features and advantages will become more apparent from consideration of the following drawings and accompanying detailed description.

DETAILED DESCRIPTION OF THE INVENTION

Figure 1:
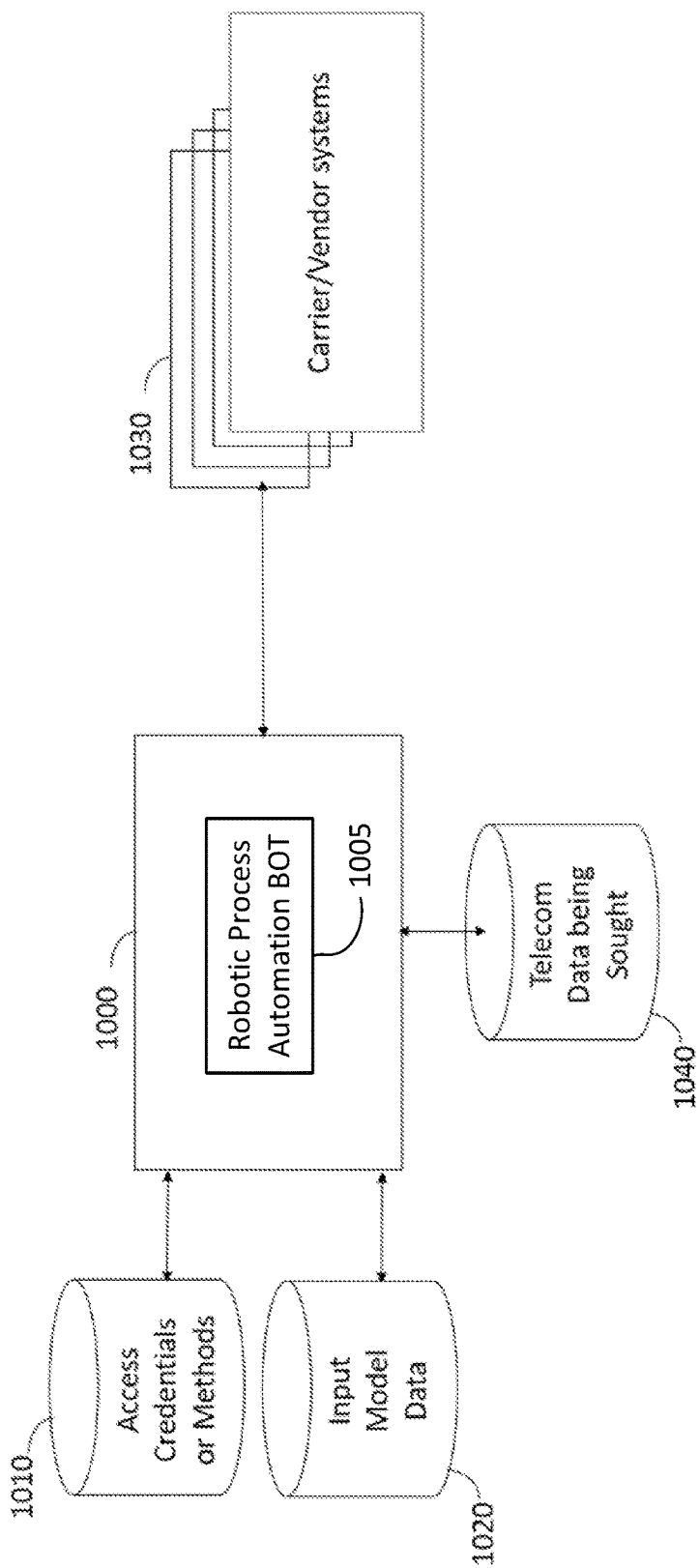
FIG. 1 is block diagram of one configuration of the Robotic Process Automation (RPA) system.

Referring now to the drawings, wherein like reference numerals designate corresponding structure throughout the views.

Just as with a human operator navigating a site, an RPA bot can follow steps that a human would take. Many TEM carriers and vendors provide websites or web-based portals allowing the retrieval of TEM data, such as invoices. While each TEM carrier or vendor website may differ from each other, they are still structured environments utilizing tags and sets of data that can be searched. These sites also utilize images that can be matched for obvious or standard functions. Image matching, as well as looking at image naming, may effectively be used to parse TEM data.

Alternate text is also used by many TEM carriers and vendors. Traditionally, alternate text is used for visually or hearing-impaired individuals. This type of data is often mandated for use in certain websites and software applications with the intent of facilitating full access to website tools and functionality to all the general public. However, the information embedded as alternate text can be leveraged for navigation by the RPA bot.

In other cases, websites and portals may be provided with special navigation tools or markers that are intended to assist Bots that access the site. For example, some sites are optimized for robot base navigation with the intent of improving search rankings. Other sites use specific files, such as, a Robots.txt file that outlines actions allowed or disallowed by robots navigating the site. While these methods that are designed to address search engine optimization for crawling bots, it is conceived that these types of tools can be leveraged for alternative actions, such as targeted RPA bot searching for TEM data.

An RPA bot can navigate menus from a UX standpoint by clicking and identifying screen content such as text, icons and images. Alternatively, an RPA bot can look directly at the structure of the website code to locate appropriate tags or other identifiable data to aid in navigation. Combinations of both approaches could also be used. Once of skill in the art will understand that many configurations could be encountered such as, a menu in an HTML file could link to Java or Python (or other) code must first execute before next steps could be seen. Alternately, a table, or a directory loaded by FTP could be used. The RPA bot must be able to both navigate the site and be able to see and interpret the results it encounters.

It is further understood that tag names may vary just like the data on the screen may be shown in different menu views with different names. This means that locating the desired data initially may be difficult for an RPA bot. However, the RPA bot can be provided with "knowledge" just like the human operator, in the form of a set of synonyms or perhaps known names or names with which the RPA bot has had success in finding the desired data. Tags such as 'invoice', 'current month' or other such names can be cycled through by the RPA bot. Using machine learning, the RPA bot can map and save the terms that it finds are successful in locating the desired data. Additionally, successful searches from other sites can also drive new synonyms or key words for the RPA bot to try. Even foreign language words can be used. In this way, the more data the RPA bot sees and processes, the more effective it becomes in finding the desired data.

FIG. 1 illustrates an overview of an RPA system may comprise a computer 1000 for gathering data from a provider. The data may, in one configuration, comprise TEM data. The computer may comprise an RPA bot 1005 that is driven by an input model. For example, the RPA bot 1005 may be provided with access credentials or methods 1010 sufficient to access a vendor system 1030, which could comprise a website or portal. It is conceived that these access credentials or methods 1010 could encompass any number of authentication methods, but at a minimum, allows the RPA bot 1005 to log in and obtain access to the site where the telecom data being sought (1040) is located.

An input model 1020 is used, which typically would comprise a representation of what the RPA bot 1005 would expect to encounter on the vendor system 1030 along with the steps required to navigate to an obtain the TEM data being sought 1040.

Figure 1A:
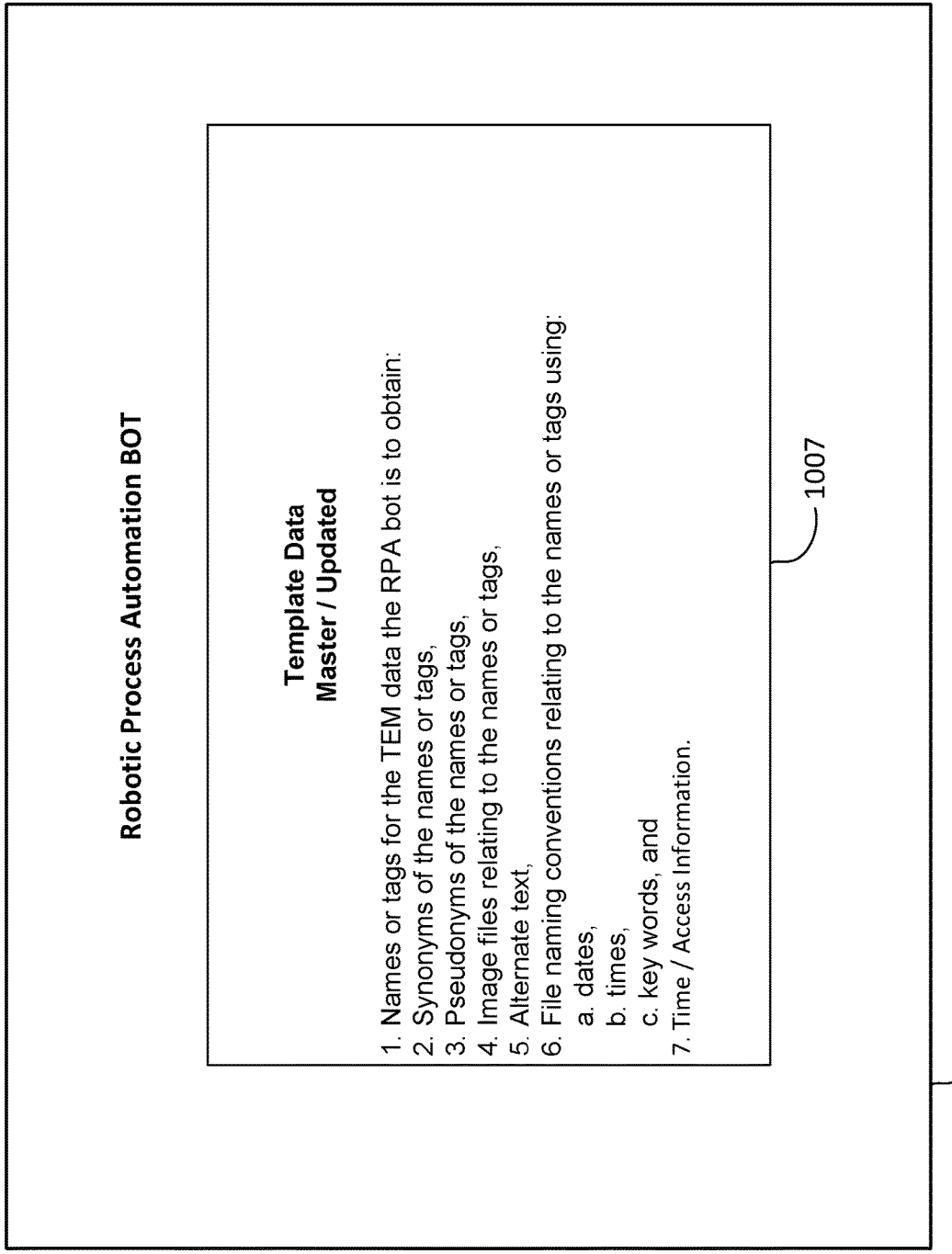
FIG. 1A is a block diagram of the template data according to FIG. 1.
Figure 1B:
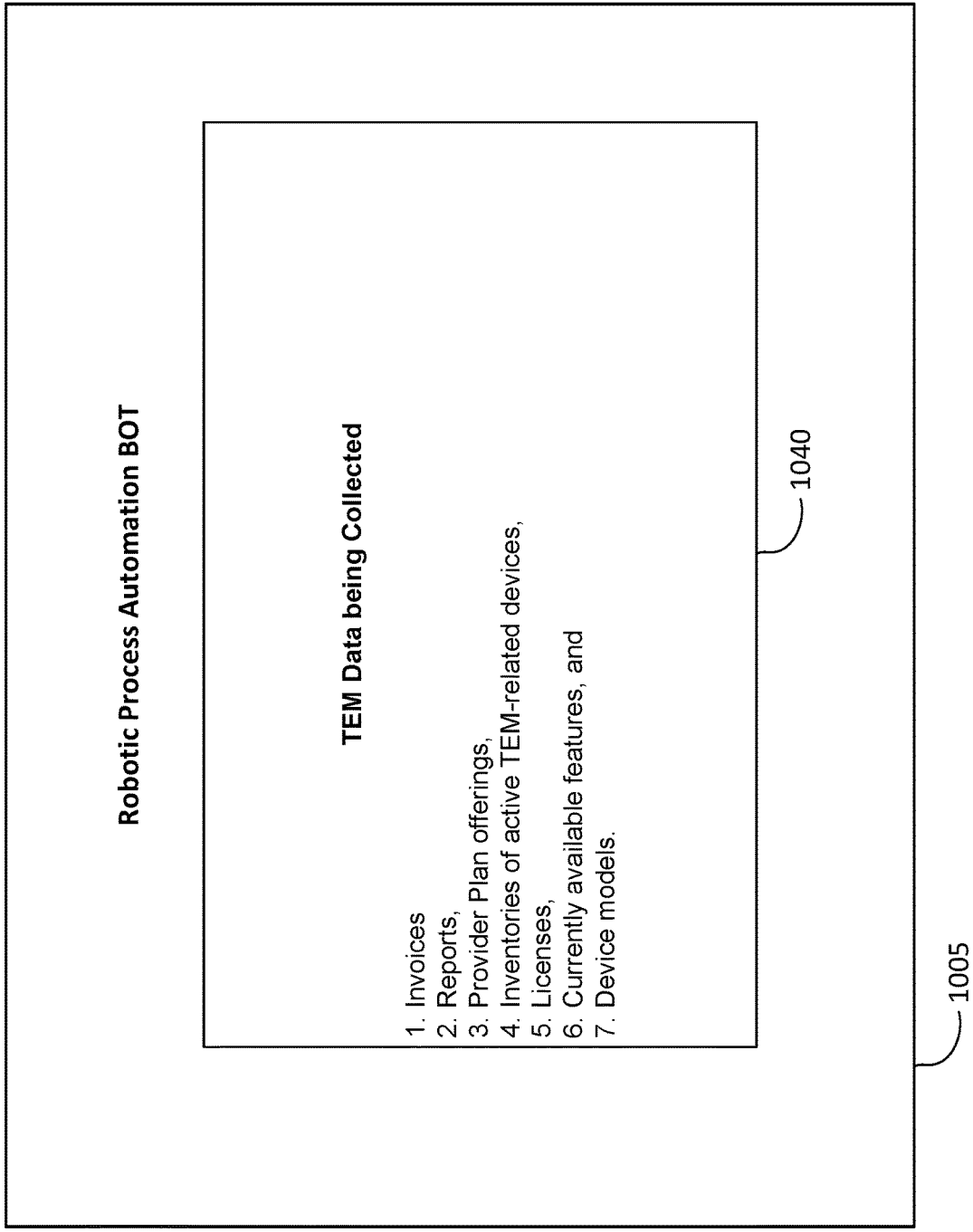
FIG. 1B is a block diagram of the TEM data according to FIG. 1.

Turning now to FIGS. 1A and 1B, an RPA bot will typically start off using a bare template and evolve independently. Function calls are used to look up synonyms and keywords.

When a particular RPA bot learns which words can be used to find desired data on a particular site, the search path and words is saved such that when the RPA bot accesses the site again, a successful search path is thus already established and can be initially used to access the desired data for a second time. New words can also be learned by the RPA bot, which can be shared with the system to help other RPA bots "learn" the new word(s) or phrase(s) building the community knowledge for all the bots. As depicted in FIG. 1A, a master template is provided that gives a minimum amount of information that allows the RPA bot to initially navigate a site to look for and obtain the information 1040 as depicted in FIG. 1B. The information depicted in FIGS. 1A & 1B is illustrative only and is not intended to be limiting. It is conceived that a greater/lesser amount of information could be provided; alternatively, different information could be provided based on the application. The template 1007 provided to the RPA bot starts with only the information provided in the master template, however, the template 1007 will grow and evolve as the RPA bot successfully finds and secures information.

Figure 2:
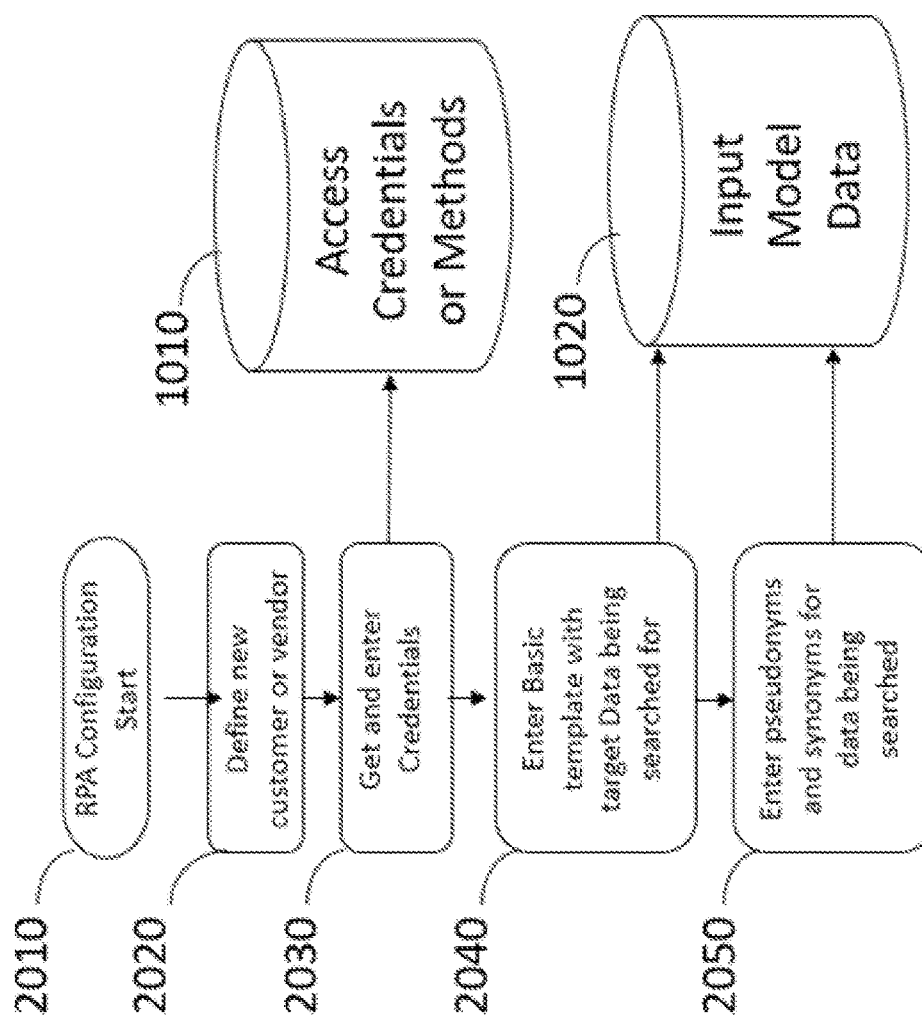
FIG. 2 is process flow diagram of the initial setup process for an RPA bot with a site according to FIG. 1.

Referring now to FIG. 2. the initial configuration steps to setup the RPA bot 1005 to find and secure data on a particular site is illustrated. The configuration starts 2010 by defining a new customer or vendor 2020. This could involve, for example, assigning a name, number, or account to a specific vendor.

Credentials 2030 or other access methods sufficient to access the vendor system are saved in storage 1010 and are accessible by computer 1000. This information may be provided during the initial setup process for the RPA bot.

The next step is to create a basic template with data being searched for 2040. This data helps to create an input model for the RPA bot 1005 and is stored in the input model storage 1020 to be accessed by the RPA bot. Additional data, such as synonyms/pseudonyms or other information that would be useful to the RPA bot 1005 in finding the desired data is also entered into the template 2050. It should be noted that the model data 1020 may be stored in XML, may be generated through visual drag and drop systems, or may be among other things, natural language instruction. The adjustments to the model take the model format into account to make changes in the appropriate format.

Figure 3:
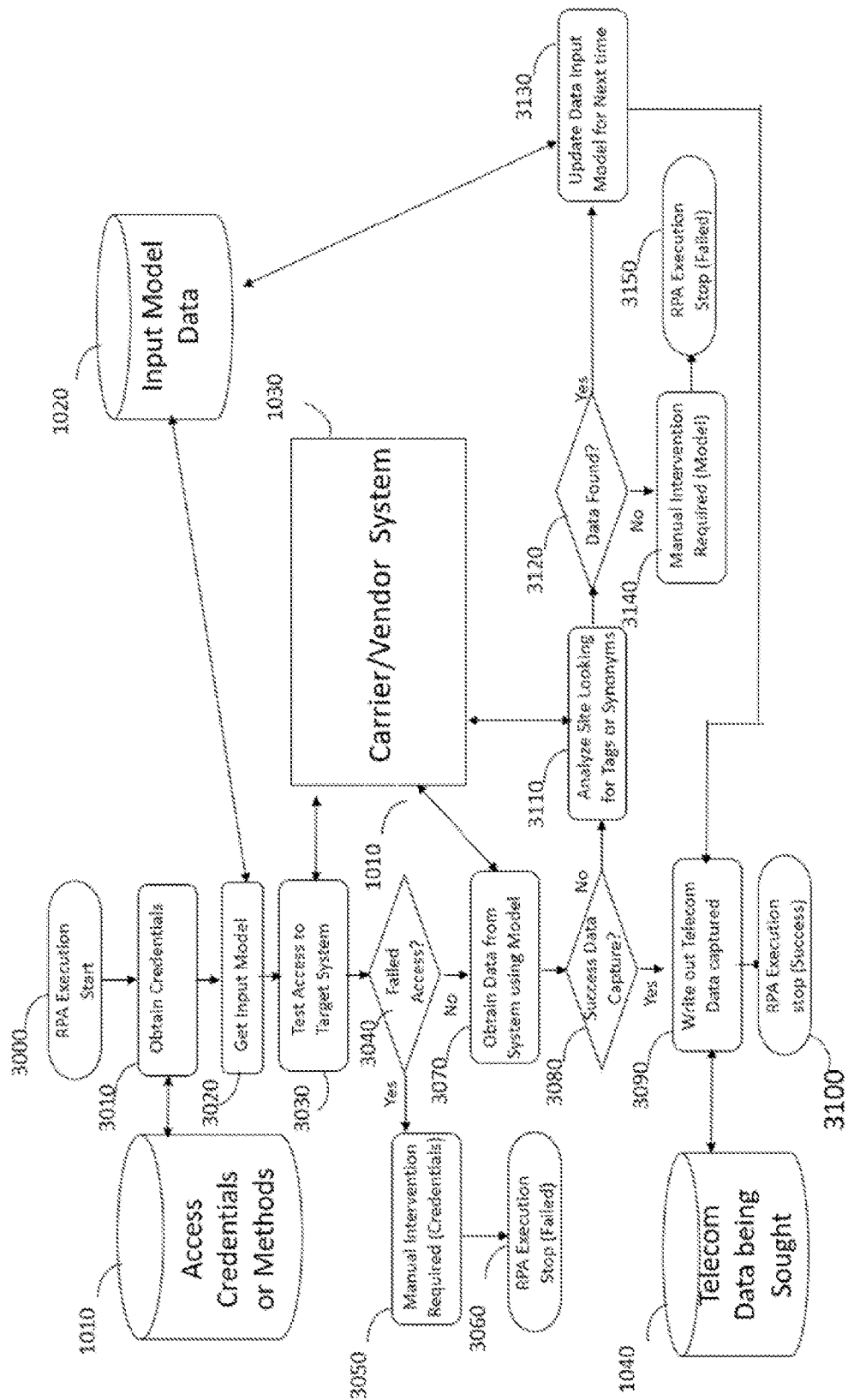
FIG. 3 is process flow diagram of the adjustment process for an RPA bot when a site has been modified according to FIG. 2.

FIG. 3 depicts an overview of the RPA self-modifying logic. At this point the input data model 1020 has already been set up to assist the RPA bot to obtain the desired target data. The RPA bot initiates or starts 3000 by navigating to the target site as per the appropriate timing from the input model when it expects the data to be available. The RPA bot then accesses the credentials 3010 from the access credentials or methods store 1010. Additionally, the RPA bot accesses the input model 3020 from the input model store 1020. The RPA bot then attempts to access the carrier/vendor system 1030 by testing access 3030 to the target system. It should be noted that the steps of accessing the credentials 1010 and the input models 1020 may occur simultaneously and comprise the loading of the template to the RPA bot, which is saved as data the RPA bot can access as it seeks to access a site.

If the RPA bot fails to access 3040 the site, then a manual intervention may be required 3050. For example, if the input credentials provided to the RPA bot may be expired or the website address to the site may have changed, or the password to access the site may have been modified, among other things. This failure to access the site can cause the system to automatically generate a call for reset of or adjustment of the input credentials or of a URL for the site. If the RPA bot is unable to proceed past the login for the site, this problem is flagged and the RPA bot execution is halted 3060 until the input credentials are adjusted. In one configuration, the RPA bot may attempt to access the site again (a limited number of retries) after a delay period to obviate the access problem if it was a transitory access issue. It is also conceived that the RPA bot may encounter additional access security challenges, such as passwords that require changes, captchas, or the like. Some of these may be overcome programmatically while some may require manual intervention to update the credentials.

A fairly common occurrence is detecting if a site or a portal is down or under maintenance. In some cases, a label is raised on the portal showing 'under maintenance' or 'maintenance is being performed on such and such dates or times and some features may not be available'. Detecting and reacting to such messages and screens is also incorporated into the intelligence of the self-healing RPA system. For example, the system could note that site access is not available and set a new time to access the site at a later period. Alternately, data could be embedded into the "under maintenance" message telling the RPA bot when to try and access the site again. Still further, the RPA bot could "talk" with the site such that the site will inform the RPA bot when the site is again available for access. This can be critical when the timing of paying bills is critical for incentives.

If access is successful 3040 the RPA bot will use the input model 1020 to attempt to retrieve the desired data 3070. If successful 3090 the RPA bot will save the captured data 3090 in the telecom data storage 1040 and the RPA bot process terminates 3100 successfully.

If the data being sought is not located 3080 the RPA bot will then proceed to analyze the site 3110 using known pseudonyms and synonyms in order to find the data. It should be noted that this is not a brute force search of the site sweeping through all of the menus, but rather a targeted look at the site to find matches to the information in the template the RPA bot is using. In other words, the search will proceed much the same way as if an individual were searching the site, using information stored in memory to look at the locations most likely to have the data sought. If the data is located 3120, then the input model 1020 is updated 3130 so that the next time the RPA bot accesses the site, it can repeat the newly learned path to the desired information. In some cases, the RPA may have navigated to the appropriate website location, however the data is simply not available yet. For example, the RPA Bot may have found the list of invoices, but the current month invoice has not been uploaded by the carrier/vendor system yet. In such cases, as with a maintenance event the RPA will retry at a later time. While the path that the RPA bot takes to find the information has been discussed as learned information, it should be noted that the timing of when the RPA bot seeks to access the information can also be learned. In this way the system can self-adjust to key in on the when the optimal time to is to obtain the desired data as early as possible. In another case, the RPA bot may be programmed to find the first availability of a new device from multiple vendors. If the RPA bot is not successful in obtaining the desired data 3120, then manual intervention 3140 may be called for requiring updating of the input model at which point the RPA bot execution halts 3150.

It should be noted that at step 3110 where the RPA bot is, among other things, looking for tags; once a tag(s) is identified, the tags will likely remain constant and consistent. This is important because, even if the structure of a webpage subsequently changes, when the RPA bot accesses the site for future data retrievals, finding the same tags is a relatively easy task. If the structure of the site has changed necessitating a differing set of steps to access the desired data, the RPA bot can use the identified tags to find the correct path to the data and these modified steps can be saved for the next time the RPA bot seeks to access the site.

It should be noted that the steps the RPA bot attempted in the first process for identifying and locating tags do not have to be replicated for any subsequent searches by the RPA bot. The tag information can provide the RPA bot with significant information on how to find the desired data. As such, the RPA bot can navigation directly to the appropriate tag, once identified to point to the target data being sought. Any failed steps during the initial site searching by the RPA bot can be discarded so that the path to the data is optimized. Accordingly, the RPA bot creates an input model to guide the bot for the next time is accesses the site.

Another problem the RPA bot could encounter when logging into a site or portal is, once logged in, certain websites may attempt to load services such as videos of Flash. In some cases, this could prompt warnings when loading the page, such as, the need to download or upgrade a Flash player. These types of warning or attempts to auto play videos can cause confusion for or disrupt the RPA bot from fulfilling its function. As such, in one configuration the use of JavaScript may be employed to disable these functions for the RPA bot session.

Still another problem an RPA bot may encounter is that it may be looking for information on a first language and encounter the site presenting information in a second language. In this situation, the RPA bot can look to use translation tables. In some cases, however, and this may be true from template driven GUIs the variables and tag names may simply be randomly assigned as variable 1,2,3 and not representative of the information they contain. In these cases, the initial deployment of the RPA bot may be more challenging, but subsequent adjustments will allow for the names to be retained once discovered. The model can also apply this knowledge to other sites through machine learning.

As previously discussed, the RPA bot may also adapt and apply machine learning techniques to optimize navigation of a site and obtain data in the most efficient way possible by employing some of the same analysis and discovery steps done when the site was initially visited for the first time. These same steps may also apply to when the RPA bot fails to obtain data quickly following a previous input model but the site has been modified.

The data used to describe the steps and thus define the input model or 'programming' for the RPA may be saved in a database, in an XML file or some other proprietary format used for input to drive the process automation. In one configuration, it may comprise a sequence of steps that the RPA bot executes to find the tag or find the recognizable elements that lead it to get the resultant values or files that it is programmed to look for. Thus, when the system creates this file, modifies it, or optimizes it, the programming of the RPA bot is modified to efficiently locate and retrieve the TEM data it was set out to discover and find.

In some cases, the data being sought may no longer be available, it may have been moved to another system (entailing a new set of credentials), or it may have had the formatting modified (changing the target of the search) or it may be moved to an archive area (perhaps only the last 12 months of invoices are in the main area, but older invoices are stored somewhere else or require the push of a 'more' button). While the system is intended to fully run automatically and autonomously to look for telecom expense management data, it is contemplated that there are certain limited instances when manual intervention may be needed. However, this manual intervention is to provide the RPA bot with the information needed to proceed rather than for manual intervention in performing necessary steps in the data gathering process.

What is provided then is a system that creates and deploys an RPA bot which is armed to automatically adapt to and evolve with a changing target environment. The RPA bot is 'intelligent' in that it is initially provided with data that it can leverage to find the information it is seeking, and it 'learns' the particular path to this data after working it out on the site. It then can take the information it learned and use it to expand its knowledge base for future attempts to access the data and perform the least number of steps needed to obtain the desired data. The system is also provided with the ability to continue learning if the site changes to not only find the data, but also learn the quickest path to the data.

Figure 4:
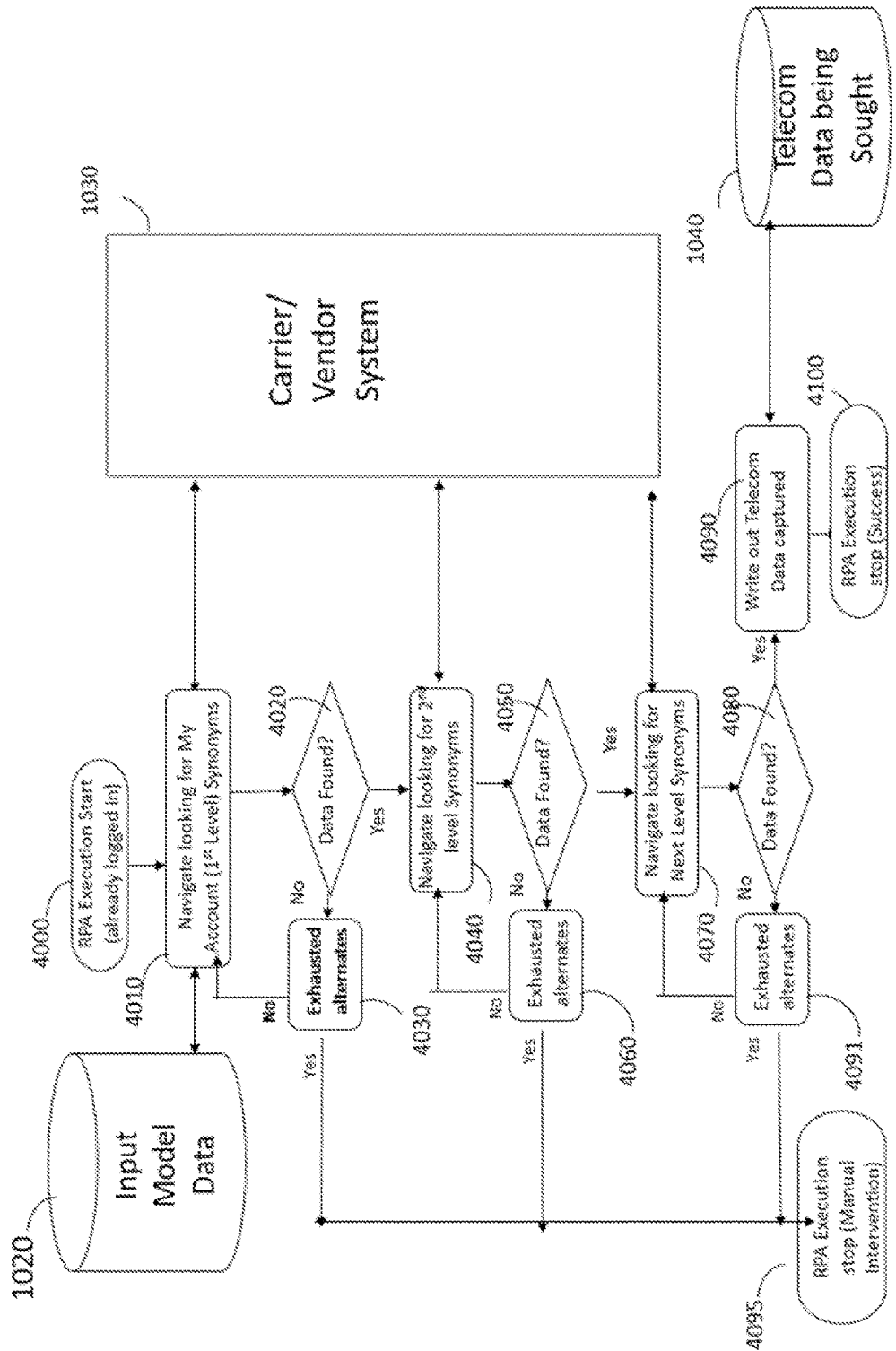
FIG. 4 is process flow diagram of the data gathering process for an RPA bot after initial setup according to FIG. 2.

FIG. 4 is an overview of the RPA logic used to determine a path to finding relevant data. The RPA bot execution starts 4000 after the RPA bot has already obtained the credentials for the site and logged in to access the carrier/vendor system or site 1030.

The Input model 1020 contains data about the structure as well as the search tags, images, or other data that may be used to locate the desired data 1040.

In the example shown, telecom data 1040 is searched using a hierarchical structure where the RPA bot initially looks through synonyms for the first level 4010 of data to be found. This could include, for example, a menu structure for something like 'My Account' where data could be found related to invoicing.

If the RPA bot matches the 'My Account' $1^{st}$ level synonym with the data found 4020, it continues to the $2^{nd}$ level synonym searching 4040. If not, the RPA bot will find an alternate 4030, which was supplied in the input model 1020 to search again. A list of alternates 4030 could be included in the Input Model Data 1020 for the $1^{st}$ level synonyms 4010. In the case of 'My Account', this data may include phrases like 'Account Info', 'Account details', and so on. This list may, in one configuration, be traversed one by one as the RPA looks for Alternates 4030. It should be noted that as the RPA bot identified information that is used on the site, this information can be saved for future searching. For example, if the site changes and the data cannot be initially located based on the current input data from previous successful data captures, the system can use the saved information as a starting point for searching for new locations rather than starting a new and traversing one by one through the template data. If the alternatives have been exhausted 4030 then the algorithm may stop and go to manual intervention 4095, which may involve updating the template, adding alternatives, or finding a different approach.

Again, referring to FIG. 4, once found, the $2^{nd}$ level synonyms are looked for 4040. In the case of an invoice search, the RPA bot knows it has successfully found the Account Info ($1^{st}$ level) area, so it now looks for synonyms such as 'current month'. If the telecom data being sought 1040 is found, the RPA bot continues to $3^{rd}$ level searches. If not, it looks for alternates 4060, which were again supplied by the input data model 1020. If the alternatives have been exhausted 4060, then the algorithm may stop and go to manual intervention 4095 as previously described. In keeping with the example of an invoice, these may include files with the current months date, tags such as 'current month', 'latest', and so on.

Once again when this data is located, the RPA bot continues looking at next level synonyms 4070 and performs the same function of searching alternates 4090 that are provided with the input model data 1020. If the alternatives have been exhausted 4091 then the algorithm may stop and go to manual intervention 4095 as previously described. Again, in keeping with the example of an invoice, the RPA bot has found the account area, it has found that current month or latest area, and will now look for a .pdf file or a screen showing the details of the current bill data. Once located 4080, the telecom data is captured 4090 (in this example it is the latest invoice), which telecom data is then saved to a storage 1040 after which the RPA bot execution stops 4100.

Figure 5:
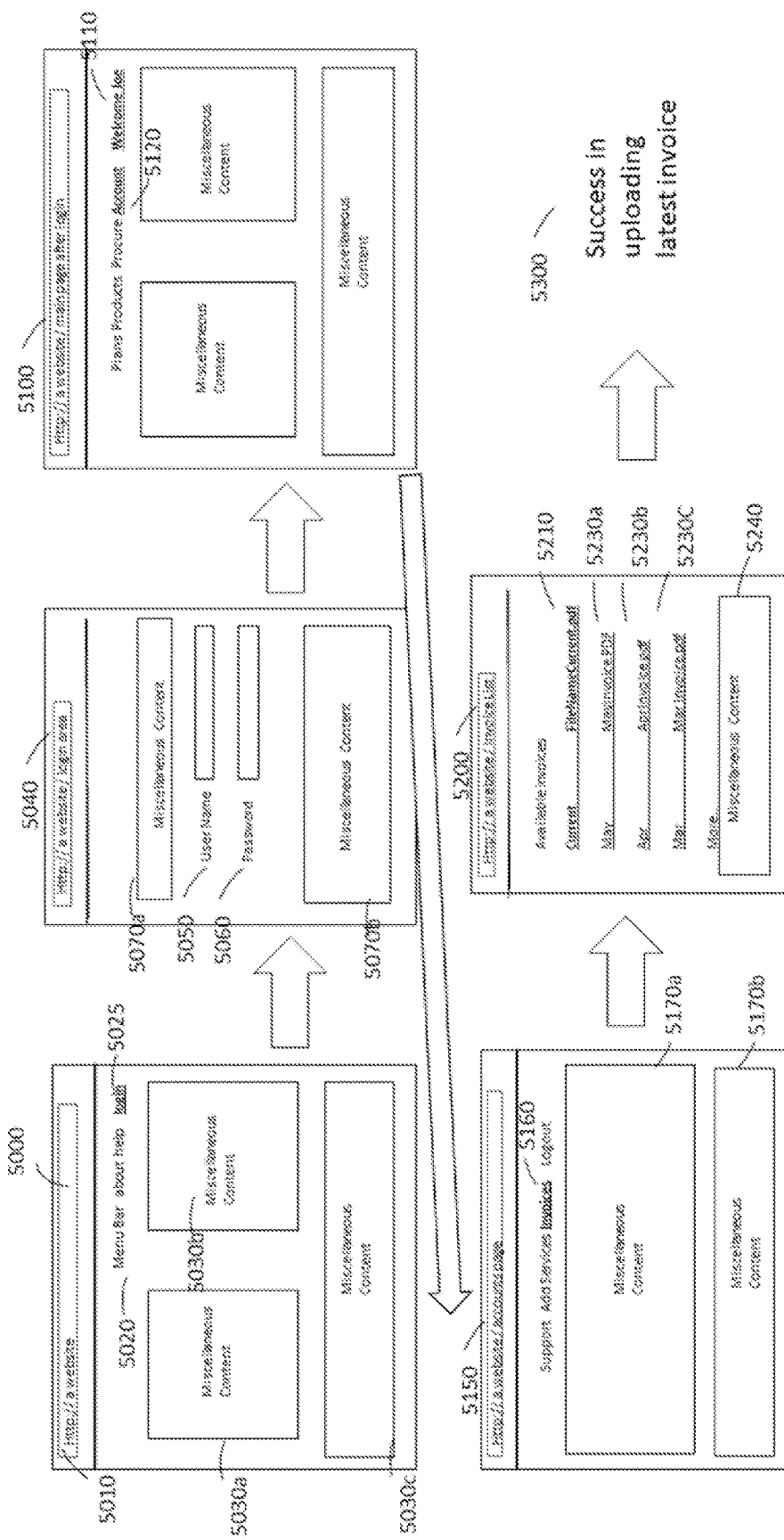
FIG. 5 is a block diagram of the RPA system allowing for the updating of the template data according to FIG. 1.

FIG. 5 is an illustration of a sample website being processed by the RPA bot 1005. The sample webpage 5000 comprises a URL bar 5010 that allows for the entry of the address for the web page. The RPA bot would initially be directed to this address by the input model as a starting point based on the credential information. The page contents typically include various areas having associated data 5030a-c that will vary from site to site. It is quite common for a webpage to have a menu bar 5020 that includes menu items. The menu bar 5020 in this case, has an entry called out as 'login' 5025, which would correspond to input model data for the RPA bot. A table of synonyms for tags including phrases such as 'sign in', 'log in', 'login', and 'user account' among other words and phrases would be consulted by the RPA bot. In this example, the tag 'login' 5025 would be matched. It should be noted that the detection of this tag could be done in the source HTML, or even visually by interpreting the visible portion of the website. The ability to find tags is not limited to HTML searching but may be accomplished using screen scraping and image detection. This could be necessary where the source of the web page may be, for example, compiled or dynamic.

The RPA bot identifies the URL or web location associated with the login tag above, and navigates to the login page 5040 where it looks for the second level tags to complete the login. In this case, the tags 'user name' 5050 and 'password' 5060 are matched. However, in other cases synonyms may include text such as 'login', 'user ID', 'name' and so on. These synonyms are scanned in the most likely order based on data derived from numerous RPA bots seeking similar information. As the RPA bot progresses will again encounter various panes of data 5070a-b on the page. In some cases, this may include additional login challenges and checkboxes. For example, a mathematical or visual challenge question may be directed to an operator or may be solved by the RPA through image recognition.

Once found, the RPA bot would use the supplied credentials and overcome any challenges to gain access to the site 5100. This brings the RPA bot to the main page 5100 of the site where it can start looking for the information it is trying to secure. In this example, the RPA is looking for the latest invoice issued by the provider.

The RPA bot can verify that is has successful logged in by finding indications such as a 'welcome' message 5110 on the main page 5100. The RPA bot will have searched in the template for synonyms such as invoice, account, billing in order to locate the information it is seeking. In the example page provided, the RPA bot locates and identifies the term 'Account' which the RPA bot uses to navigate to the accounts page 5150.

Moving to the accounts page, the RPA bot then searches for Tags such as invoices, billing, new charges, bills and so on. This table of synonyms will be traversed as described in connection with FIG. 4. In the example shown, the tag 'invoices' 5160 is identified and is used to navigate to a list of invoices 5200.

Navigating to the invoices page 5200 the RPA bot is then presented with a list of invoices. From here the RPA bot can look for tags that may include: the name of the current month, the term 'current' or 'latest' or 'new' and so on. In the example presented, the term 'Current' is the tag used, and this tag points to a FileNameCurrent.pdf file link 5210. Other files are listed for older invoices 5230a-c along with other miscellaneous content 5240. From here the file 5210 can be uploaded as the RPA bot has succeeded 5300 in finding the latest invoice and the steps outlined above can be used to direct the RPA bot to find future invoices. If in future searches the RPA bot would fail to find the lasts invoice in this current location, the same type of search for tags using synonyms can be used to 'learn' the new location and adjust the input model that governs the action of the RPA bot.

Figure 6:
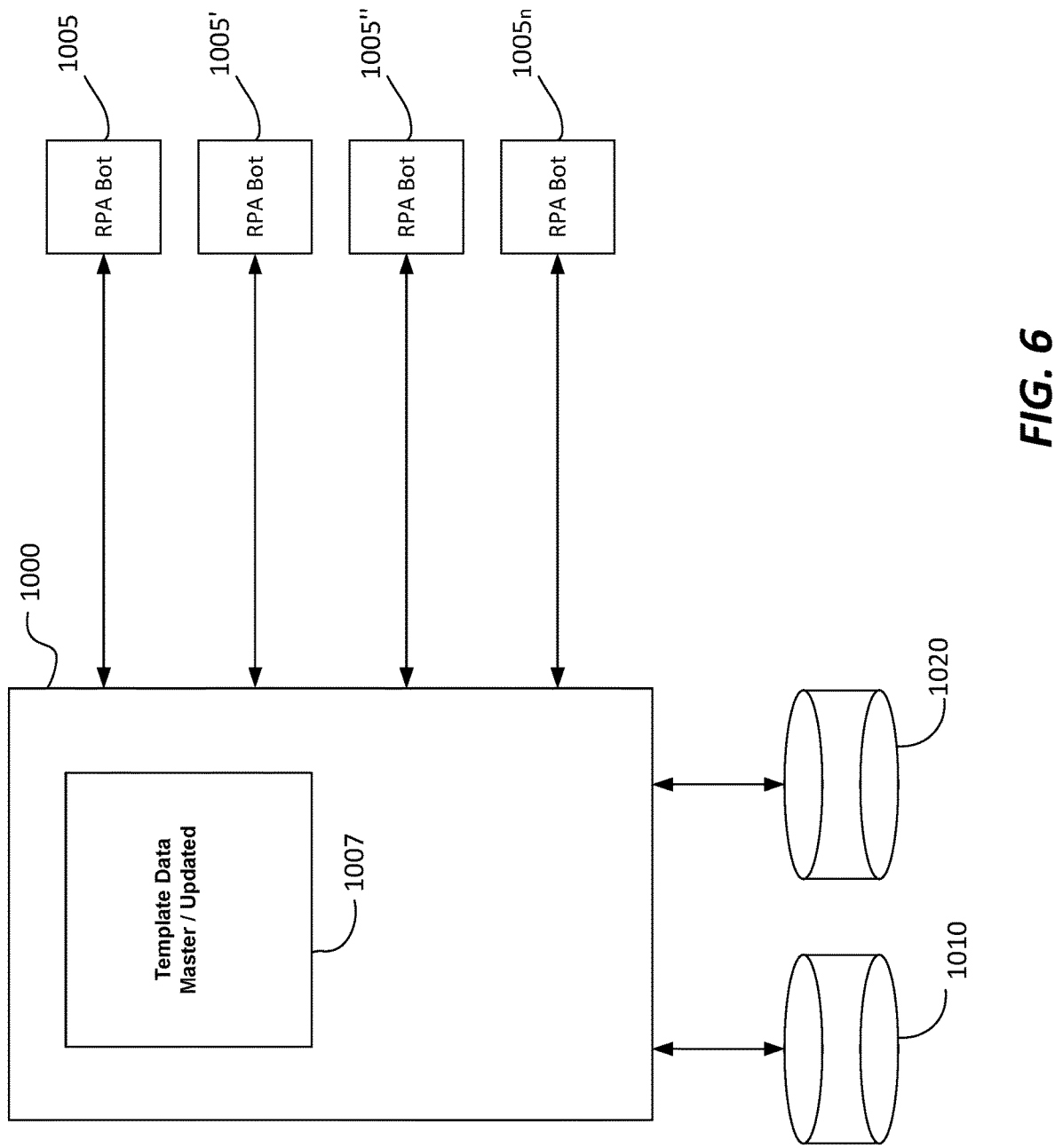
FIG. 6 is a block diagram of the RPA system according to FIG. 1.

FIG. 6 is a block diagram that illustrates the ability of the computer 1000 to leverage the learning capabilities of multiple RPA bots 1005, 1005', 1005", 1005n. When an RPA bot 1005, 1005', 1005", 1005n is initialized, it is provided with a template 1007 having information taken from a master template. The master template is generic version of information that does not include any specific path information for a particular site or portal, but rather, provides the RPA bot with the starting information it needs to navigate a site or portal. As the RPA bot actually navigates and a site or portal, it obtains information specific to the site or portal that is saved in the template of information for accessing that site or portal. This allows the RPA bot to build on previous efforts including successes and failures to find information. This in turns allows the RPA bot to function much more efficiently than conventional computers systems as the next time the RPA bot seeks to access the specific site or portal it can follow the specific learned path from previous successes. It is the specific template of data that is used to access the specific site or portal that allows for the targeted access without wasted resources in performing steps that previously have been identified as failures.

However, it is also understood that industry and language are not static. This means that the synonym and pseudonym library that is provided on the master template can and should be updated as new words and new functionality becomes available. It is conceived that the RPA bot has the ability to look for tags and identify data points that are used to define a path to the information being sought. Additionally, it is contemplated that when a new word, phrase or image is identified as being associated with a known word, phrase or image, the new information can be collected and 'learned' by the system. This learning does not have to be limited to only the RPA bot for the particular template associated with a particular site or portal. Rather, the RPA bot can transmit the new information to the computer 1000, which in turn, can then update the master template. Other RPA bots that have access to the computer 1000 can then reference the updated master template and update their own templates with the new words, phrases or images. This functionally is illustrated by the two-way arrows between the RPA bots 1005, 1005', 1005", 1005n and computer 1000. Updated information can then be saved in the various storages accessible to computer 1000 for future reference and use.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A Robotic Process Automation (RPA) system for gathering Telecommunication Expense Management (TEM) data from a provider site, the system comprising:
   a computer having a storage and a network connection;
   software executing on said computer comprising an RPA bot adapted to access the site, said RPA bot having site access credential information and a template including data relating to the TEM data;
   said template including: the names or tags for the TEM data the RPA bot is to obtain, synonyms of the names or tags, pseudonyms of the names or tags, image files relating to the names or tags, alternate text, and file naming conventions using dates, times, and key words relating to the names or tags;
   said RPA bot accessing the site for a first time and presenting the access credential information;
   said RPA bot accessing the data in said template to determine a path to access the TEM data on the site;
   said RPA bot discarding failed path attempts to access the TEM data and saving an identified path that allows the RPA bot to obtain the TEM data, the identified path including only the least number of steps needed to reach the TEM data; and
   said RPA bot gathering and transmitting the TEM data to said computer, where said computer saves the TEM data on said storage.

2. The system according to claim 1, wherein the TEM data comprises first TEM data, wherein,
   said RPA bot accessing the site for a second time to obtain second TEM data and presenting the access credential information;
   said RPA bot accessing the saved identified path data;
   said RPA bot gathering and transmitting the second TEM data to said computer, where said computer saves the TEM data on said storage.

3. The system according to claim 1, wherein the identified path data is saved to said template.

4. The system according to claim 1, wherein the TEM data comprises first TEM data, wherein,
said RPA bot accessing the site for a second time to obtain second TEM data and presenting the access credential information;
said RPA bot accessing the saved identified path data;
said RPA bot discarding failed path attempts to access the second TEM data and saving a second identified path that allows the RPA bot to obtain the second TEM data, the second identified path including only the least number of steps needed to reach the second TEM data
said RPA bot gathering and transmitting the second TEM data to said computer, where said computer saves the TEM data on said storage.

5. The system according to claim 4, wherein when the RPA bot experiences a failed path by following the saved identified path data, the RPA bot initially searches for the second identified path by following a subset of the steps making up the saved identified path.

6. The system according to claim 4, wherein the second identified path data is saved to said template.

7. The system according to claim 4, wherein,
said RPA bot accessing the site for a third time to obtain third TEM data and presenting the access credential information;
said RPA bot accessing the saved second identified path data;
said RPA bot gathering and transmitting the third TEM data to said computer, where said computer saves the third TEM data on said storage.

8. The system according to claim 1, wherein the TEM data is selected from the group consisting of: invoices, reports, provider plan offerings, inventories of active TEM related devices, licenses, currently available features, device models, accessories and combinations thereof.

9. The system according to claim 1, wherein if said RPA bot is denied access to the site after presenting the access credential information, said RPA bot automatically calls for reset of or adjustment of the input credentials or of a URL for the site.

10. The system according to claim 9, wherein the adjusted input credentials or adjusted URL are saved to said template.

11. The system according to claim 1, wherein said template is copied from a master template and the master template data is updated based on new synonyms, new pseudonyms, or new image files identified by the RPA bot.

12. The system according to claim 11, wherein a plurality of RPA bots subsequently obtain the updated data from the master template.

13. The system according to claim 1, wherein the data on said template comprises a first language, said RPA bot correlating the first language data on said template with second language data found on the site.

14. The system according to claim 1, wherein the provider site comprises a telecommunications carrier website.

15. The system according to claim 1, wherein the data on said template includes time information indicating when the RPA bot should attempt to obtain the TEM data.

16. The system according to claim 15, wherein if the TEM data is not yet available at the time indicated by the time information, the RPA bot will attempt to access the TEM data periodically.

17. The system according to claim 16, wherein when the RPA bot accesses the TEM data, the time that the TEM data was obtained will be used to adjust the time information in the template.

18. A method for obtaining Telecommunication Expense Management (TEM) data from a provider site by a Robotic Process Automation (RPA) bot, the method comprising the steps of:
contacting the site with an RPA bot executing on a computer via a network connection;
presenting site access credential information to the site with the RPA bot, which when authenticated enables the RPA bot to access the site;
accessing a template of data with the RPA bot, the template including: the names or tags for the TEM data the RPA bot is to obtain, synonyms of the names or tags, pseudonyms of the names or tags, image files relating to the names or tags, alternate text, and file naming conventions using dates, times, and key words relating to the names or tags;
determining a path to access the TEM data on the site based on the data on the template;
discarding failed path attempts by the RPA bot to access the TEM data;
saving an identified path that allows the RPA bot to obtain the TEM data, the identified path including only the least number of steps needed to reach the TEM data;
gathering and transmitting the TEM data to the computer; and
saving the received TEM data on a storage accessible by the computer.

19. The method according to claim 18, wherein the TEM data comprises first TEM data, the method further comprising the steps of:
contacting the site with an RPA bot a second time;
presenting the site access credential information to the site with the RPA bot;
accessing and executing the saved identified path data;
gathering and transmitting second TEM data to the computer; and
saving the received second TEM data on the storage accessible by the computer.

20. The method according to claim 18, further comprising the step of saving the identified path data to the template.

21. The method according to claim 18, wherein the TEM data comprises first TEM data, the method further comprising the steps of:
contacting the site with an RPA bot a second time;
presenting the site access credential information to the site with the RPA bot;
accessing and executing the saved identified path data;
discarding failed path attempts by the RPA bot to access second TEM data;
saving a second identified path that allows the RPA bot to obtain the second TEM data, the second identified path including only the least number of steps needed to reach the second TEM data;
gathering and transmitting the second TEM data to the computer; and
saving the received second TEM data on the storage accessible by the computer.

22. The method according to claim 21, wherein when the RPA bot experiences a failed path by following the saved identified path data, the method further comprises RPA bot performing the step of:

initially executing a subset of the steps making up the saved identified path when searching for the second identified path.

23. The method according to claim 21, further comprising the step of saving the second identified path data to the template.

24. The method according to claim 18, wherein the TEM data is selected from the group consisting of: invoices, reports, provider plan offerings, inventories of active TEM related devices, licenses, currently available features, device models, accessories and combinations thereof.

25. The method according to claim 18, wherein if said RPA bot is denied access to the site after presenting the access credential information, the method further comprises the RPA bot performing the step of:
automatically calling for reset of or adjustment of the input credentials or of a URL for the site.

26. The method according to claim 25, wherein the adjusted input credentials or adjusted URL are saved to said template.

27. The method according to claim 18, further comprising the step of:
updating a master template based on new synonyms, new pseudonyms, or new image files identified by the RPA bot.

28. The method according to claim 27, further comprising the step of:
updating templates of a plurality of RPA bots with the updated data from the master template.

29. The method according to claim 18, wherein the data on the template comprises a first language, the method further comprising the step of the RPA bot correlating the first language data on the template with second language data found on the site.

30. The method according to claim 18, wherein the provider site comprises a telecommunications carrier website.

31. The method according to claim 18, wherein the data on the template includes time information indicating when the RPA bot should attempt to obtain the TEM data.

32. The method according to claim 31, wherein if the TEM data is not yet available at the time indicated by the time information, the RPA bot attempts to access the TEM data periodically.

33. The method according to claim 32, wherein when the RPA bot accesses the TEM data, the time that the TEM data was obtained is used to adjust the time information in the template.

* * * * *